United States Patent
Borden et al.

[15] 3,678,073
[45] July 18, 1972

[54] N,N'-(DIHYDROXY)ETHYLENEBISNORBORNENES

[72] Inventors: George W. Borden, Charleston; David J. Trecker, South Charleston, both of W. Va.

[73] Assignee: Union Carbide Corporation, New York, N.Y.

[22] Filed: April 9, 1970

[21] Appl. No.: 27,142

[52] U.S. Cl. ................260/326 C, 8/116.2, 117/139.4, 204/21, 252/8.8, 260/325, 260/326.1
[51] Int. Cl. ......................................C07d 27/52
[58] Field of Search..................260/325, 326.1, 326 C

[56] References Cited

UNITED STATES PATENTS 3,491,113  1/1970  Schenker et al. ...................260/326.1

Primary Examiner—Alex Mazel
Assistant Examiner—Joseph A. Narcavage
Attorney—Paul A. Rose, Aldo J. Cozzi and Clement J. Vicari

[57] ABSTRACT

Novel compounds having the formula:

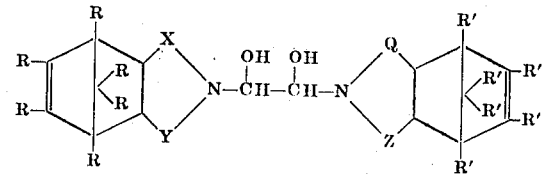

wherein R and R' may be alike or different and are selected from the group consisting of hydrogen and chlorine; and where X, Y, Z and Q may be alike or different and are selected from the group consisting of keto, and alkylene containing one to six carbon atoms.

1 Claim, No Drawings

N,N'-(DIHYDROXY)ETHYLENEBISNORBORNENES

This invention relates to norbornene compounds. More particularly the invention relates to novel N,N'-(dihydroxy)-ethylenebisnorbornenes which are particularly suitable for improving the dry wrinkle recovery of cotton fabrics.

Ionizing radiation has been used with increasing frequency to graft organic materials onto natural and synthetic fibers. The effect of the grafting is to impart certain properties to the fibers or fabrics or to change existing properties. Specifically, improvements are sought in tear strength, dyeability, rot resistance, shrink-proofing, abrasion resistance, soil release, water repellency, flame retardancy, wash-and-wear properties, and durable press.

Heretofore, the majority of materials which have been used in radiation grafting were the simple vinyl monomers, i.e., styrene, acrylonitrile, acrylamide, acrylic acid, methyl methacrylate, and the like. Recent publications which summarize this chemistry and its current status are the following:

Radiation Graft Copolymerization, F. S. Holahan, et al., Feltman Research Laboratories, Picatinny Arsenal, Dover, N.J., June 1967, unclassified AD654510.

F. Gütlbauer, E. Proksch, and H. Bildstein, Oesterr. Chemiker 67, 35 (1966)

A. Heger, Deutsche Textiltechn, 17, 307 (1967).

The present invention relates, in part, to the radiation treatment of fabrics containing compounds which are not of the simple vinyl monomer type and, hence, which were not expected to impart any particularly useful properties to the fabrics. These compounds described generally as N,N'-(dihydroxy)-ethylenebisnorbornenes, are new compositions of matter. It has been found that when these compounds are impregnated in textiles such as in cotton or cotton/polyester fabrics, and thereafter the impregnated fabrics irradiated with electrons or UV light, that durable press properties result in the treated textiles.

The compounds of the invention may be represented by the following structural formula:

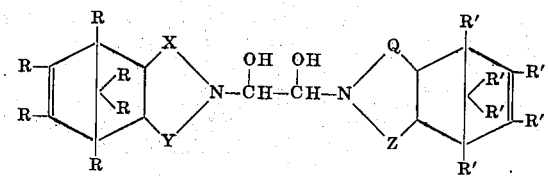

where R and R' may be alike or different and are selected from the group consisting of hydrogen and chlorine; and where X, Y, Z and Q may be alike or different and are selected from the group consisting of keto, and alkylene containing one to six carbon atoms.

Compounds contemplated by the above structural formula include the following: N,N'-(dihydroxy)ethylnebis(5-norbornene-2,3-dicarboximide), N,N'-(dihydroxy)ethylenebis(1,4,5,6,7,7-hexachloro-5-norbornene-2,3-dicarboximide), N,N'-(dihydroxy)ethylene bis(2,3-dimethyleneimine) and 1,2-bis(4-azatncyclo[5.2.1.0$^{2,6}$]-dec-8-an3-one-4-yl)-1,2-dihydroxyethylene.

Broadly the novel compounds of the invention can be prepared by a two step procedure involving (1) a Diels-Alder condensation of cyclopentadiene or hexachlorocyclopentadiene with a dienophile, such a maleic anhydride or meleimide and (2) a condensation of the nitrogen-containing Diels-Alder product (or product of subsequent reaction) with glyoxal.

The general reaction scheme can be illustrated by the following equations wherein the values of R, R', X, Y, Z and Q, are as above indicated:

Step 1

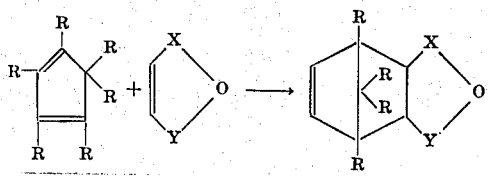

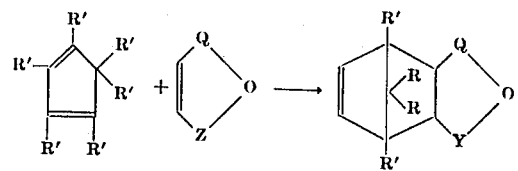

Step 2

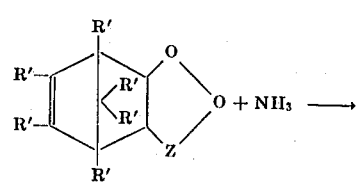

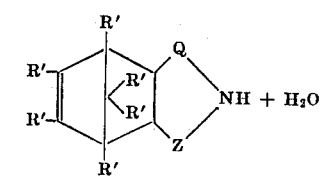

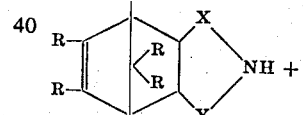

The first step, the Diels-Alder condensation is well known and has been dealt with in a number of publications. Reaction conditions for these Diels-Alder condensations have been completely detailed and may be obtained from the following publications.

A. Wasserman, "Diels-Alder Reactions" American Elsevier Publishing Co., Inc., N.Y., N.Y. 1965.

J. G. Martin and R. K. Hill, Chem, Revs., 61,537 (1961)

J. A. Norton, Chem. Revs. 31, 319 (1942)

L. W. Butz and A. W. Rytina, Org. Reactions, 5, 136 (1949)

H. L. Holmes, Org. Reactions, 4, 60 (1948)

M. C. Kloetzel, Org. Reactions, 4, 1 (1948)

The products of the reaction of step 1 are thereafter reacted with glyoxal in a second condensation type reaction. The manner of mixing the reactants is not critical and the reaction is preferably conducted in the presence of a solvent such as in the presence of methanol, ethanol, dioxane, water or aqueous mixture of the former. Thus, the products of step 1 may be premixed and the glyoxal solution added portionwise to the resultant admixture together with a catalyst, or alternatively, the glyoxal may be added as above, to one of the reactants and thereafter the other reactant added.

The reaction of step 2 is conducted in the presence of a catalytic amount of a base representative of which include sodium hydroxide, potassium hydroxide, calcium hydroxide, sodium carbamate, sodium methoxide, pyridine, potassium t-butoxide, triethylamine and the like. The preferred basic catalysts are aqueous solutions of sodium or potassium hydroxide.

The basic catalyst is employed in catalytically significant quantities. Thus, the catalyst can be employed in amounts of from about 0.001 mole percent to about 10 mole percent, and more preferably from about 0.01 to 0.5 mole percent, based on the total weight of the reaction mixture.

In general, the reaction temperature at the time of mixing is maintained so as to prevent a strong exotherm. There are suitable conventional techniques known to the art for affecting this purpose and hence no detailed discussion of the technique or apparatus appears to be necessary. Operating temperatures subsequent to the mixing of the reactants can be varied over a relatively wide range such as from about 30° to about 100° C., preferably about 50° to about 85° C. and most preferably from about 60° to about 80° C. Depending upon the reactants employed the reaction time may vary from a few minutes to several days. Normally however, the reaction is carried out for about 10 minutes to about 5 hours and preferably about 30 minutes to about 2 hours. The reaction can be conducted under atmospheric pressures although super-atmospheric or sub-atmospheric pressures can be employed if desired.

The product resulting from the reaction is normally separated and this can be usually accomplished by subjecting the solution to evaporation to the point where the product of the reaction precipitates. The product may then be collected by a filtration procedure and purified in conventional manner such as by recrystallization from solution, distillation, sublimation, solvent washing, etc.

As mentioned previously the compounds have utility as durable press additives for textile fabrics. The textile fabrics which can be treated with the novel compounds of the present invention could be in the form of a woven or nonwoven fabric composed of fibers such as those fabricated from cotton, cotton/polyester blends, cellulose acetate, rayon, wool, nylon 6, nylon 66, polyacrylonitrile, and the various derivatives and blends of the above. If the material is to be directly padded onto a fabric, the solution is diluted to the desired percentage of organic (0.5–20 percent by weight; usually 5–10 percent by weight) with a solvent or solvent mixture that permits cosolution of all solutes. Water is preferred, but if solubility difficulties occur, methanol or aqueous methanol can be employed. Other materials may optionally be added to the pad bath. These include surfactants, emulsifiers, softeners, Lewis acid catalysts (e.g., magnesium or zinc salts), and other additives conventionally employed in textile treatments.

The treatments to impart durable press to the fabric is conventional and can be carried out in any of the following conventional sequences.

A. Pad solution containing compound of the invention onto fabric, heat cure, irradiate, dry.
B. Pad solution containing compound of the invention onto fabric, heat cure, rewet, irradiate.
C. Pad solution containing compound of the invention onto fabric (with free radical source included, e.g., persulfate), heat cure only.
D. Pad solution containing compound of the invention onto fabric, dry irradiate, heat cure.
E. Pad solution containing compound of the invention onto fabric, irradiate wet, heat cure.
F. Pad solution containing compound of the invention onto fabric, irradiate wet.
G. Pad solution containing compound of the invention onto fabric, dry irradiate.

If the impregnated fabric is to be precured (A and B) or subjected to heat cure only (C), the composition of the pad bath is typically as follows:

8 parts reactant
1/10 part surfactant
2 parts magnesium chloride-hexahydrate (or other Lewis acid)
Remainder distilled water If the material is to be preirradiated (D and E) or irradiated only (F and G), pad bath need not contain the catalyst. This is applied following the irradiation in the case of D and E and is typically contained in a second pad, the composition of which is normally an aqueous solution of a surfactant and an acid or basic catalyst such as sodium bicarbonate or magnesium chloride or other known catalysts.

The heat curing, whether carried out before, after, or in lieu of irradiation, consists of holding the treated fabrics in a hot air oven at temperatures of about 100° to 500° F. (preferably 200°–400° F.) for periods of 0 to 10 minutes (preferably 2–5 minutes; most preferably about 3 minutes).

Irradiation may be either particulate or non-particulate in nature. Particulate radiation includes $\alpha$-particles (helium nuclei), generated from rare gas ion accelerators and $\beta$-ray (electrons), generated from electron accelerators (van de Graaff, Dynamitron, Insulated Core Transformer, etc.). Non-particulate radiation includes $\gamma$-rays, generated from nuclear reactors and natural isotopes (cobalt 60, cesium-137, and the like), and ultraviolet and visible light (2,000–8,000 A.) generated from mercury, carbon, xenon, cadmium and krypton arcs, and similar sources. Preferred is electron irradiation. The electrons may be 0.1–3.0 Mev. (million electron volts). Preferred are 0.1–2.0 Mev. electrons; most preferred are 0.1–0.5 Mev. electrons. Radiation doses may range from 0.01 to 20 megarads. Preferred are doses of 0.1–10 megarads. Most practical is the dose range of 0.5–megarads.

The fabrics treated in the manner described above are tested for improvement in wrinkle recovery by the conventional Monsanto Dry Wrinkle recovery procedure (A.A.T.C.C. 66–1959P).

The following example will illustrate the present invention.

EXAMPLE 1

N,N'-(Dihydroxy)ethylenebis-(5-norbornene-2,3-dicarboximide)

5-Norbornene-2,3-dicarboximide was prepared by the procedure of W. Worall, J. Am. Chem. Soc. 82 5710 (1960) as follow:

A mixture of 5-norbornene-2,3-dicarboxylic acid anhydride (379 g.) and concentrated aqueous ammonia (2 liters) was refluxed for 9 hours. The solid dissolved within 1 hour and the temperature rose to 100° C. Cooling and filtration gave the 5-norbornene-2,3-dicarboximide (330 g., 88 percent yield). M.p. 186°–187° C. 5-Norbornene-2,3dicarboximide (34.6 g.) and glyoxal (7 g.) were added to 100 cc. of water together with 10 drops of 10 percent sodium hydroxide. The mixture was heated to 70° C. for 2 hours and there was produced in the reaction medium N,N'-(dihydroxy)ethylenebis(5-norbornene-2,3-dicarboximide) which was identified by evaporation of the solution to dryness, and examination of the infra red and nuclear magnet resonance spectra of the product. Both spectra were consistent with the proposed structure. To the mixture was added 0.5 g. of surfactant "TERGITOL" 15-S-9 (a nine mole ethoxalate of a linear secondary alcohol with an average of 15 carbon atoms, and which is manufactured by Union Carbide Corporation) and 358 g. of 50 percent water-methanol.

Samples of 100 percent cotton broadcloth were padded with the above solution and squeezed to approximately 60 percent wet-pickup. These samples were then treated by one of the following procedures:

Procedure (A)   Dried at 150°F. for 5 minutes, conditioned at 70°F. and 65% RH for 24 hours, irradiated, 2 mrads dose. Radiation source was a 2 Mev. van de Graaff generator manufactured by High Voltage Engineering.

Procedure (B)   Dried at 150°F. for 5 minutes, rewet with water to 100% wet-pickup, irradiated, 2 mrads dose. Radiation source was a 2 Mev. van de Graaff generator manufactured by High Voltage Engineering.

The following physical properties were noted:

| Wrinkle Recovery | | Tear Strength Warp | | Tear Strength | | % Applied |
|---|---|---|---|---|---|---|
| (A) | (B) | (A) | (B) | (A) | (B) | |
| 248° | 250° | 624 | 672 | 448 | 608 | 6.0 |

Properties of the untreated cotton broadcloth were as follows:

| Wrinkle Recovery | Tear Strength Warp | Tear Strength Fill |
|---|---|---|
| 162° | 1008 | 928 |

Although certain preferred embodiments of the invention have been disclosed for purposes of illustration, it will be evident that various changes and modifications may be made therein without departing from the scope and spirit of the invention.

What is claimed is:

1. N,N'-(Dihydroxy)ethylenebis(5-norbornene-2,3-dicarboximide).

* * * * *